(12) United States Patent  
Wang et al.

(10) Patent No.: US 12,339,426 B2  
(45) Date of Patent: Jun. 24, 2025

(54) OPTICAL ZOOM CAMERA MODULE AND ASSEMBLING METHOD THEREFOR

(71) Applicant: NINGBO SUNNY OPOTECH CO., LTD., Zhejiang (CN)

(72) Inventors: Mingzhu Wang, Zhejiang (CN); Takehiko Tanaka, Zhejiang (CN); Yinli Fang, Zhejiang (CN); Chunmei Liu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 936 days.

(21) Appl. No.: 17/284,267

(22) PCT Filed: Aug. 19, 2019

(86) PCT No.: PCT/CN2019/101280  
§ 371 (c)(1),  
(2) Date: Apr. 9, 2021

(87) PCT Pub. No.: WO2020/073736  
PCT Pub. Date: Apr. 16, 2020

(65) Prior Publication Data  
US 2021/0382270 A1    Dec. 9, 2021

(30) Foreign Application Priority Data

Oct. 10, 2018    (CN) .......................... 201811177674.3  
Oct. 10, 2018    (CN) .......................... 201821654311.X

(51) Int. Cl.  
*G02B 7/02*      (2021.01)  
*G02B 7/00*      (2021.01)  
(Continued)

(52) U.S. Cl.  
CPC ............ *G02B 13/009* (2013.01); *G02B 7/003* (2013.01); *G02B 7/021* (2013.01); *G02B 7/023* (2013.01);  
(Continued)

(58) Field of Classification Search  
CPC .......... G02B 7/00; G02B 7/003; G02B 7/004; G02B 7/02; G02B 7/021; G02B 7/023; G02B 7/025; G02B 7/09; G02B 7/10  
(Continued)

(56) References Cited

U.S. PATENT DOCUMENTS

| 4,171,880 A | 10/1979 | Mori et al. |
| 7,639,306 B2 * | 12/2009 | Yu ........................ G02B 7/102 348/374 |

(Continued)

FOREIGN PATENT DOCUMENTS

| CN | 103529534 | 1/2014 |
| CN | 105445889 | 3/2016 |

(Continued)

OTHER PUBLICATIONS

International Search Report issued Nov. 22, 2019 in International (PCT) Application No. PCT/CN2019/101280.

(Continued)

*Primary Examiner* — Thong Q Nguyen  
(74) *Attorney, Agent, or Firm* — Wenderoth, Lind & Ponack, L.L.P.

(57) ABSTRACT

An optical zoom camera module, including: at least two camera module components and a glue material; each of the at least two camera module components has at least one lens group, and each lens group includes at least one lens; all of the lens groups of the at least two camera module components together constitute an imageable optical system, wherein at least two of the lens groups are movable lens (Continued)

groups, and the at least two movable lens groups are respectively fixed with different motor carriers, so as to move separately under the driving of a motor; and the glue material, once cured, fixes and supports the at least two camera module components, so that relative positions of the at least two camera module components are maintained at relative positions determined by an active alignment. A method for assembling the optical zoom camera module is also provided.

17 Claims, 3 Drawing Sheets

(51) Int. Cl.
    *G02B 7/09*     (2021.01)
    *G02B 7/10*     (2021.01)
    *G02B 13/00*     (2006.01)

(52) U.S. Cl.
    CPC .............. *G02B 7/025* (2013.01); *G02B 7/09* (2013.01); *G02B 7/10* (2013.01)

(58) Field of Classification Search
    USPC .................................. 359/808–830, 676–706
    See application file for complete search history.

(56) References Cited

U.S. PATENT DOCUMENTS

| | | |
|---|---|---|
| 2006/0061885 A1 | 3/2006 | Ito et al. |
| 2014/0043525 A1 | 2/2014 | Azuma et al. |
| 2017/0160509 A1* | 6/2017 | Wang ..................... G02B 7/003 |
| 2020/0192051 A1* | 6/2020 | Wang ..................... G02B 7/025 |
| 2020/0333619 A1* | 10/2020 | Ang ........................ G02B 5/208 |

FOREIGN PATENT DOCUMENTS

| | | |
|---|---|---|
| CN | 107404604 | 11/2017 |
| CN | 207336891 | 5/2018 |
| CN | 207336902 | 5/2018 |
| CN | 108322738 | 7/2018 |
| CN | 208969313 | 6/2019 |
| EP | 3 385 766 | 10/2018 |

OTHER PUBLICATIONS

Extended European Search Report issued Sep. 28, 2021 in corresponding European Patent Application No. 19872009.6.

* cited by examiner

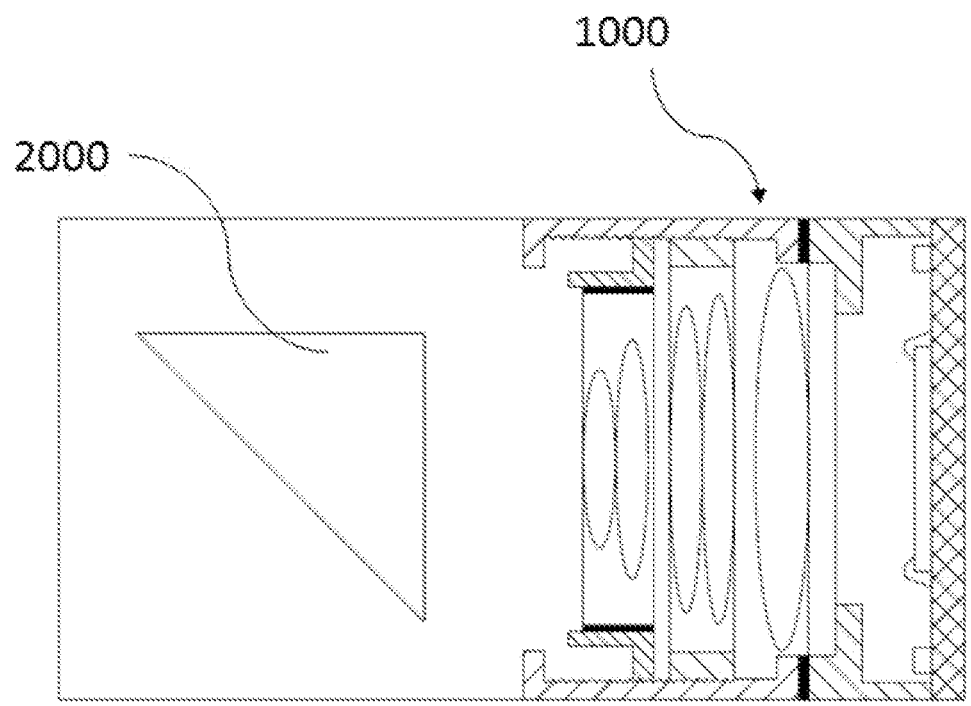
Fig.5
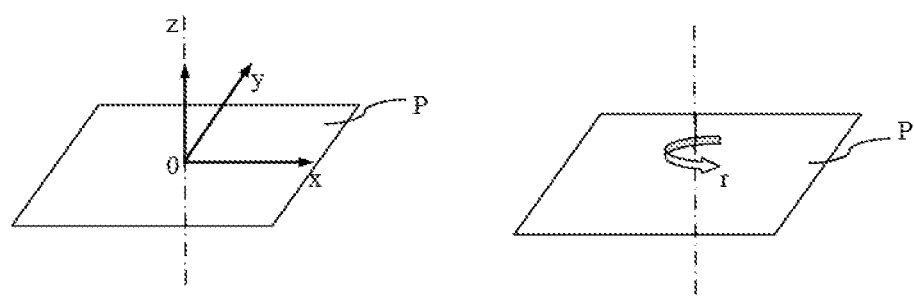 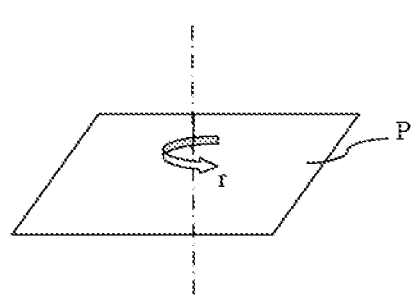
Fig.6A  Fig.6B
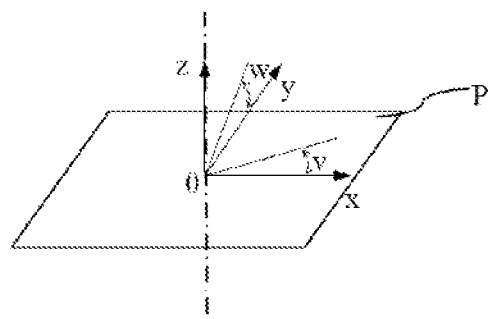
Fig.6C

OPTICAL ZOOM CAMERA MODULE AND ASSEMBLING METHOD THEREFOR

CROSS REFERENCES TO RELATED APPLICATIONS

This application requires the priority and benefit of the Chinese invention patent application filed at the China National Intellectual Property Office (CNIPA) on Oct. 10, 2018, with application number 201811177674.3, and the invention title of "Optical zoom camera module and assembly method thereof", as well as the Chinese utility model patent application filed at CNIPA on Oct. 10, 2018, with the application number 201821654311.x, and the invention title of "optical zoom camera module", which are incorporated herein by reference in its entirety.

FIELD OF THE INVENTION

This application relates to the field of optical imaging technology. In particular, this application relates to an optical zoom camera module and an assembly method thereof.

BACKGROUND OF THE INVENTION

With the development of mobile phones, computers and other terminals, users have greatly improved their needs. Especially with the development of mobile phones, users' pursuit of shooting quality has led manufacturers to develop personalized and customized camera modules, such as a lens with a large aperture, a large wide angle, and a large number of lenses that solve aberrations. On one hand, this makes the optical design more and more complex; on the other hand, the complex optical system is more sensitive, which poses big challenges to the manufacturing yield and product quality. Because the optical system of a camera module with a large aperture and a large wide angle is more sensitive, the reliability of its manufacturing process and verification process will be more fragile than conventional designs. Therefore, an optical lens with a better structure is now needed.

In the mobile phone camera module industry, in order to continuously pursue better imaging performance and optical zoom effects, the total number of lenses will continue to increase. The increase in the number of lenses will increase the number of assembly errors and the cumulative amount of tolerances. To achieve optical zoom without blurring the image, at least two relatively movable lens groups are required. The relative position accuracy of several groups that require relative movement when assembled will be an important parameter that affects the imaging effect of the camera module. However, as the number of groups increases, the relative positions of the groups that need to be guaranteed are also increasing, and the difficulty of assembly continues to increase. This leads to very high requirements on the manufacturing precision of a single lens and the assembly precision of a single group when obtaining an optical variable (optical zoom) camera module with high-standard imaging performance. In this case, the level of assembly technology has become a bottleneck for product specifications. In other words, only under the premise of extremely high requirements for processing materials, can it be possible to assemble an optically variable camera module product that is compliant with the relative position between groups and has up to standard performance. Therefore, in the prior art, the cost of optical variable camera modules (especially compact optical variable camera modules, such as optical variable camera modules that can be installed in mobile phones) is extremely high, and the yield rate is difficult to be guaranteed (Because the quality of processing materials is difficult to be achieved). This will make it very difficult to assemble high performance lenses and achieve mass production.

Furthermore, in the prior art, for a compact optical variable camera module, when the lens is assembled into a lens barrel (this process may be called assembling), only some physical dimensions of a single group can be obtained, but the optical performance of the product cannot be obtained. Therefore, it is usually only when all the lenses are installed in the lens barrel, and then the groups are combined to obtain a complete optical system. Finally, the optical performance test is carried out. However, at this time, the lens group can no longer be repaired and its performance cannot be improved, so usually the defective products detected can only be discarded. This leads to a further increase in the production cost of the compact optically variable camera module.

SUMMARY OF THE INVENTION

This application provides a solution that can overcome at least one defect of the prior art.

According to one aspect of the present application, there provides an optical zoom camera module, including: at least two camera module components and a glue material located between the at least two camera module components; each of the at least two camera module components has at least one lens group, each of the lens groups includes at least one lens, all of the lens groups of the at least two camera module components together constitute an imagable optical system, and wherein at least two of the lens groups are movable lens groups, the at least two movable lens groups are respectively fixed with different motor carriers, so as to move separately under the driving of the motor; wherein, the cured glue material fixes and supports the at least two camera module components, so that relative positions of the at least two camera module components are maintained at relative positions determined by the active alignment, wherein the active alignment adjusts the relative position of the at least two camera module components based on an actual imaging result of the optical system.

Wherein, the at least two camera module components include a second camera module component, and the second camera module component includes a motor housing, a first motor carrier, a second motor carrier, and a second lens group, wherein the first motor carrier and the second motor carrier are respectively movably connected to the motor housing, and the second lens group is mounted on the second motor carrier.

Wherein, the at least two camera module components further include a first camera module component, and the first camera module component includes a first lens group.

Wherein, the glue material includes a first glue material, and the first glue material is located between the first camera module component and the first motor carrier, and the cured first glue material fixes and supports the first camera module component and the first motor carrier, so that the relative positions of the two are maintained at the relative positions determined by the active alignment, wherein an axis of the first camera module component and an axis of the first motor carrier have an included angle that is not zero.

Wherein, the second camera module component further includes a lower subgroup of first lens group, the lower subgroup of first lens group is mounted on the first motor carrier; and the at least two camera module components further include a first camera module component, and the first camera module component includes a upper subgroup of first lens group.

Wherein, the glue material includes a first glue material, and the first glue material is located between the upper subgroup of first lens group and the lower subgroup of first lens group, and the cured first glue material fixes and supports the upper subgroup of first lens group and the lower subgroup of first lens group, so that the relative positions of the two are maintained at the relative positions determined by the active alignment, wherein the axis of the upper subgroup of first lens group and the axis of the lower subgroup of first lens group have an included angle that is not zero.

Wherein, the at least two camera module components further include a third camera module component, and the third camera module component includes a photosensitive assembly and a third lens group mounted on the photosensitive assembly.

Wherein, the glue material further includes a second glue material, the second glue material is located between the photosensitive assembly and the motor housing, and the cured second glue material fixes and supports the photosensitive assembly and the motor housing, so that the relative positions of the two are maintained at the relative positions determined by the active alignment, wherein the axis of the photosensitive assembly and the axis of the motor housing has an included angle that is not zero.

Wherein, the second camera module component further includes a third lens group, and the third lens group is fixed to the motor housing.

Wherein, the first motor carrier is driven by an electromagnetic drive module or a piezoelectric drive module, and the second motor carrier is driven by an electromagnetic drive module or a piezoelectric drive module.

Wherein, the first motor carrier and/or the second motor carrier are movably connected to the motor housing through an elastic sheet; or the first motor carrier and/or the second motor carrier are movably connected to the motor housing through the combination of a ball and a movement guide piece.

Wherein, the actual imaging result of the optical system is an actual measurement value of the optical performance of the optical system obtained based on the actual imaging result within the entire stroke of the at least two movable lens groups; or an actual measurement value of the optical performance of the optical system obtained based on the actual imaging result at a plurality of representative positions representing the entire stroke of the at least two movable lens groups.

According to another aspect of the present application, there further provides a method for assembling an optical zoom camera module, including: pre-positioning at least two camera module components separated from each other, wherein each of the at least two camera module components has at least one lens group, and at least two lens group of the at least two camera module components are movable lens groups, and the at least two movable lens groups are respectively fixed with different motor carriers, so as to move separately under the driving of the motor, and the pre-positioning makes all of the lens groups of the at least two camera module components together constitute an imagable optical system; actively aligning the at least two camera module components, wherein the relative positions of the at least two camera module components are adjusted based on actual imaging results of the optical system; and bonding the at least two camera module components by glue material, so that the relative positions of the at least two camera module components are maintained at the relative positions determined by the active alignment.

Wherein, the at least two camera module components include a first camera module component and a second camera module component; wherein the first camera module component includes a first lens group, and the second camera module includes a second lens group, a motor housing, a first motor carrier and a second motor carrier, wherein the first motor carrier and the second motor carriers are respectively movably connected with the motor housing, and the second lens group is mounted on the second motor carrier.

Wherein, the glue material includes a first glue material, and in the bonding step, the first glue material is provided between the camera module component and the first motor carrier, the first glue material is then cured, and the cured first glue material fixes and supports the first camera module component and the first motor carrier, so that the relative positions of the two are maintained at the relative positions determined by the active alignment.

Wherein, the at least two camera module components include a first camera module component and a second camera module component; the first camera module component includes an upper subgroup of first lens group, and the second camera module component includes a lower subgroup of first lens group, a second lens group, a motor housing, a first motor carrier, and a second motor carrier, wherein, the first motor carrier and the second motor carrier are respectively movably connected with the motor housing, the lower subgroup of first lens group is mounted on the first motor carrier, and the second lens group is mounted on the second motor carrier.

Wherein, the glue material includes a first glue material, and in the bonding step, the first glue material is provided between the upper subgroup of first lens group and the lower subgroup of first lens group, the first glue material is then cured, and the cured first glue material fixes and supports the upper subgroup of first lens group and the lower subgroup of first lens group, so that the relative positions of the two are maintained at the relative positions determined by the active alignment.

Wherein, the second camera module component further includes a third lens group fixed to the motor housing.

Wherein, the at least two camera module components further include a third camera module component, and the third camera module component includes a photosensitive assembly and a third lens group mounted on the photosensitive assembly.

Wherein, the glue material further includes a second glue material, and in the bonding step, the second glue material is provided between the photosensitive assembly and the motor housing, the second glue material is then cured, and the cured second glue material fixes and supports the photosensitive assembly and the motor housing, so that the relative positions of the two are maintained at the relative position determined by the active alignment.

Wherein, the photosensitive assembly includes a color filter, and the third lens group is attached to the color filter.

Wherein, during the active alignment, the active alignment of the at least three camera module components is performed by fixing the second camera module component and moving the first camera module component and the third camera module component in multiple degrees of freedom.

Wherein, the active alignment further includes: obtaining an actual measurement value of the optical performance of the optical system based on the actual imaging result within the entire stroke of the at least two movable lens groups; or obtaining an actual measurement value of the optical performance of the optical system based on the actual imaging result at a plurality of representative positions representing the entire stroke of the at least two movable lens groups.

Compared with the prior art, the present application has at least one of the following technical effects:
1. The present application can realize a stepless zoom of the camera module.
2. The present application can realize the active alignment of the zoom lens based on the optical imaging quality, which is beneficial to improve the imaging quality of the zoom camera module.
3. The present application helps to reduce the requirements for the accuracy of processing materials and helps reduce the production cost of optical zoom camera modules (especially compact optical zoom camera modules).
4. In the present application, for the processing materials that cannot be adjusted to achieve the performance standards, the single group can be discarded, or the replaced group can be assembled with other groups (seeking to offset the deviation between groups), so it can reduce the production cost.
5. The present application can avoid the increase in thickness of terminal devices (such as smart phones) through a periscope design.

BRIEF DESCRIPTION OF THE DRAWINGS

Exemplary examples are shown in the referenced drawings. The examples and drawings disclosed herein should be regarded as illustrative rather than restrictive.

FIG. 5 shows a periscope optical zoom camera module in an embodiment of the present application;

FIG. 6A shows a relative position adjustment manner in an active alignment in an embodiment of the present application;

FIG. 6B shows a rotation adjustment in an active alignment of another embodiment of the present application;

FIG. 6C shows a relative position adjustment manner added with adjustment in v and w directions in an active alignment according to another embodiment of the present application.

DETAIL DESCRIPTION OF THE INVENTION

Figure 1:
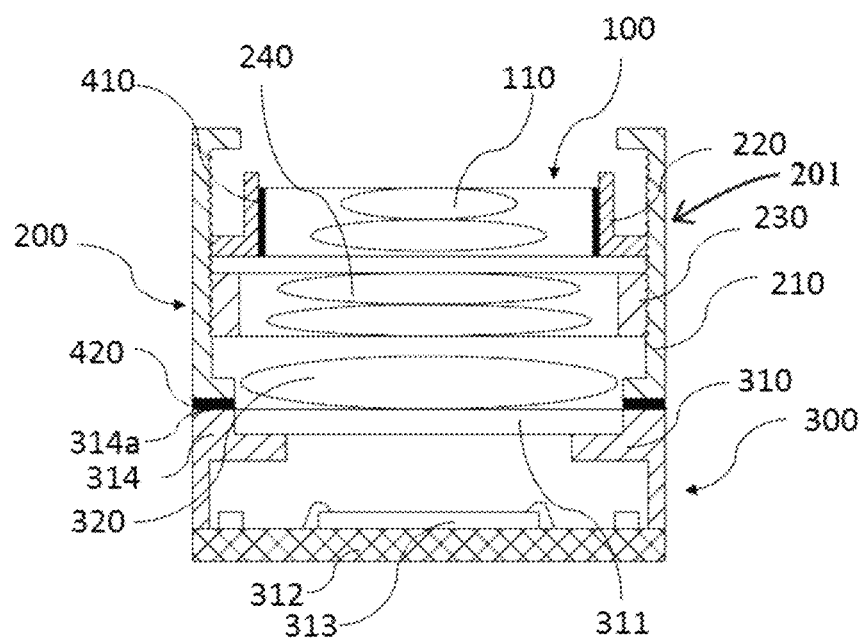
FIG. 1 shows a schematic cross-sectional view of an optical zoom camera module according to an embodiment of the present application.

In order to better understand the application, various aspects of the application will be described in more detail with reference to the accompanying drawings. It should be understood that these detailed descriptions are only descriptions of exemplary embodiments of the present application, and are not intended to limit the scope of the present application in any way. Throughout the specification, the same reference numerals refer to the same elements. The expression "and/or" includes any and all combinations of one or more of the associated listed items.

It should be noted that, in this specification, expressions such as first, second, etc. are only used to distinguish one feature from another feature, and do not represent any restriction on the feature. Therefore, without departing from the teachings of the present application, the first subject discussed below may also be referred to as the second subject.

In the drawings, the thickness, size, and shape of objects have been slightly exaggerated for ease of description. The drawings are only examples and are not drawn strictly to scale.

It should also be understood that the terms "include", "including", "having", "comprise" and/or "comprising", when used in this specification, mean that the stated features, wholes, steps, operations, elements and/or components are present, but do not exclude the presence or addition of one or more other features, wholes, steps, operations, elements, components, and/or combinations thereof. In addition, when expressions such as "at least one of" appear after the list of listed features, the entire listed feature is modified, rather than the individual elements in the list. In addition, when describing the embodiments of the present application, the use of "may" means "one or more embodiments of the present application". Also, the term "exemplary" refers to an example or illustration.

As used herein, the terms "substantially", "approximately", and similar terms are used as terms representing approximation, not as terms representing degree, and to describe measured values or the inherent deviation in the calculated values that will be recognized by those of ordinary skill in the art. Unless otherwise defined, all terms (including technical terms and scientific terms) used herein have the same meanings as commonly understood by those of ordinary skill in the art to which this application belongs. It should also be understood that terms (such as those defined in commonly used dictionaries) should be interpreted as having meanings consistent with their meanings in the context of related technologies, and will not be interpreted in an idealized or excessively formal sense unless it is clearly defined herein.

It should be noted that the embodiments in the application and the features in the embodiments can be combined with each other if there is no conflict. Hereinafter, the present application will be described in detail with reference to the drawings and in conjunction with the embodiments.

FIG. 1 shows a schematic cross-sectional view of an optical zoom camera module according to an embodiment of the present application. Referring to FIG. 1, in this embodiment, the optical zoom camera module includes three camera module components and a glue material that bonds the three camera modules together. The three camera module components are a first camera module component 100, a second camera module component 200, and a third camera module component 300, respectively. The first camera module component 100 includes a first lens group 110. The second camera module component 200 includes a motor housing 210, a first motor carrier 220, a second motor carrier 230 and a second lens group 240. The first motor carrier 220 and the second motor carrier 230 are respectively movably connected with a motor 201 housed in the motor housing 210, and the second lens group 240 is mounted on the second motor carrier 230. The glue material includes a first glue material 410, the first glue material 410 is located between the first camera module component 100 and the first motor carrier 220, and the cured first glue material 410 fixes and supports the first camera module component 100 and the first motor carrier 220, so that the relative positions of the two are maintained at the relative positions determined by the active alignment. In the actual production process, due to the manufacturing tolerances of the optical elements themselves and the assembly tolerances in the process of assembling the optical elements into lens groups, the position determined by the active alignment for the best imaging effect may be relatively inclined. In other words, an axis of the first camera module component and an axis of the first motor carrier may have an included angle that is not zero. The third camera module component 300 includes a photosensitive assembly 310 and a third lens group 320 mounted on the photosensitive assembly 310. The glue material also includes a second glue material 420, the second glue material 420 is located between the photosensitive assembly 310 and the motor housing 210, and the cured second glue material 420 fixes and supports the photosensitive assembly 310 and the motor housing 210, so that the relative positions of the two are maintained at the relative positions determined by the active alignment. Similarly, due to the manufacturing tolerances of the optical elements themselves and the assembly tolerances in the process of assembling the optical elements into lens groups, the position determined by the active alignment for the best imaging effect may be relatively inclined. In other words, an axis of the photosensitive assembly and an axis of the motor housing may have an included angle that is not zero. Referring to FIG. 1, it can be seen that the first motor carrier and the second motor carrier share a same motor housing in this embodiment.

Figure 2:
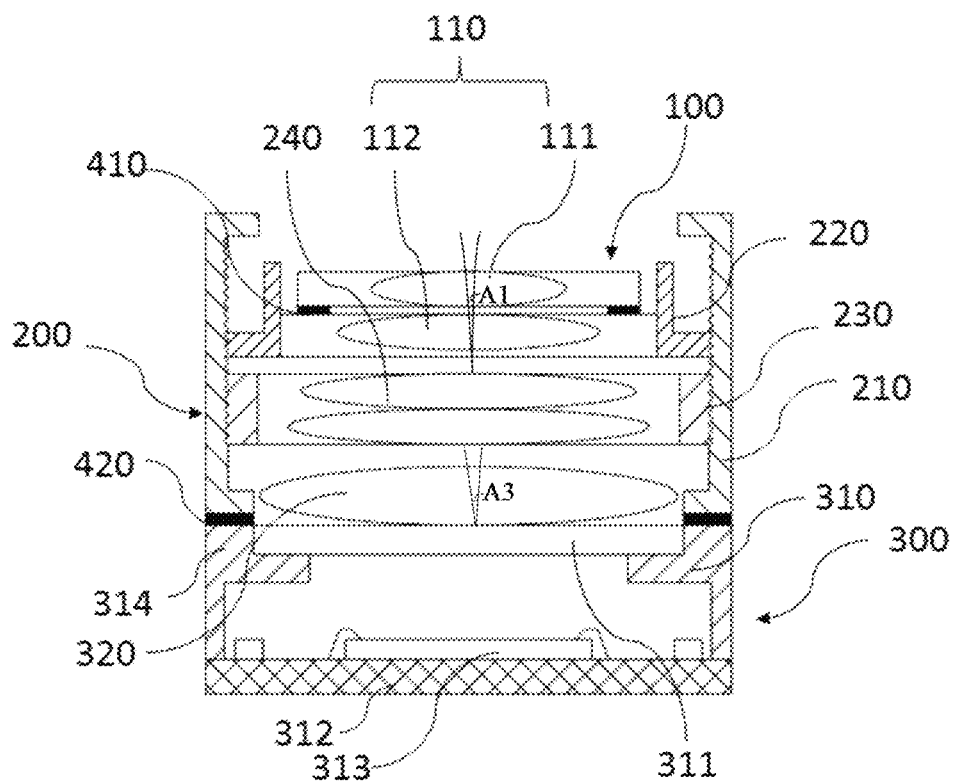
FIG. 2 shows a schematic cross-sectional view of an optical zoom camera module according to another embodiment of the present application.

FIG. 2 shows a schematic cross-sectional view of an optical zoom camera module according to another embodiment of the present application. Referring to FIG. 2, in this embodiment, the optical zoom camera module includes three camera module components and a glue material that bonds the three camera modules together. The three camera module components are a first camera module component 100, a second camera module component 200, and a third camera module component 300, respectively. The first camera module component 100 includes an upper subgroup 111 of the first lens group. The second camera module component 200 includes a motor housing 210, a first motor carrier 220, a second motor carrier 230, a lower subgroup 112 of the first lens group and a second lens group 240, wherein the first motor carrier 220 and the second motor carrier 230 is respectively movably connected with the motor housing 210, and the second lens group 240 is mounted on the second motor carrier 230, and the lower subgroup 112 of the first lens group is mounted on the first motor carrier 220. The glue material includes a first glue material 410, which is located between the upper subgroup 111 of the first lens group and the lower subgroup 112 of the first lens group, and the cured first glue material 410 fixes and supports the upper subgroup 111 of the first lens group and the lower subgroup 112 of the first lens group, so that the relative positions of the two are maintained at the relative positions determined by the active alignment. After the bonding is completed, the upper subgroup 111 of the first lens group and the lower subgroup 112 of the first lens group together constitute a first lens group 110, and the first lens group 110 can move under the driving of the first motor carrier 220. Due to the manufacturing tolerances of the optical elements themselves and the assembly tolerances in the process of assembling the optical elements into lens groups, the position determined by the active alignment for the best imaging effect may be relatively inclined. In other words, an axis of the upper subgroup of first lens group and an axis of the lower subgroup of first lens group may have an included angle A1 that is not zero. Further, the third camera module component 300 includes a photosensitive assembly 310 and a third lens group 320 mounted on the photosensitive assembly 310. The glue material also includes a second glue material 420, the second glue material 420 is located between the photosensitive assembly 310 and the motor housing 210, and the cured second glue material 420 fixes and supports the photosensitive assembly 310 and the motor housing 210, so that the relative positions of the two are maintained at the relative positions determined by the active alignment. Similarly, due to the manufacturing tolerances of the optical elements themselves and the assembly tolerances in the process of assembling the optical elements into lens groups, the position determined by the active alignment for the best imaging effect may be relatively inclined. In other words, an axis of the photosensitive assembly and an axis of the motor housing may have an included angle A3 that is not zero.

In the above-mentioned embodiment, the three lens groups include a zoom lens group and a focusing lens group (that is, the first lens group and the second lens group), which can realize a stepless zoom. Moreover, in the above embodiment, the three camera module components are assembled based on the positional relationship determined by the active alignment, which helps to reduce the requirements for the accuracy of the processing materials, and helps to reduce the production cost of the optical zoom camera module (especially the compact optical zoom camera module).

Further, still referring to FIG. 1, in one embodiment, in the third camera module component, the photosensitive assembly 310 includes a circuit board 312, a photosensitive chip 313 mounted on a surface of the circuit board 312, and a lens holder 314 mounted on the surface of the circuit board 312 and surrounding the photosensitive chip 313 and a color filter 311 mounted on the lens holder 314. The third lens group 320 can be attached to the color filter 311. A top surface of the lens holder 314 has a flat surface 314a exposed to the outside of the color filter 311, and the flat surface 314a can be used as a glue arranging surface for arranging the second glue material 420. In other words, the second glue material may be located between the top surface of the lens holder and the bottom surface of the second motor housing (or the shared motor housing). At this time, the top surface of the lens holder can be regarded as the top surface of the photosensitive assembly. In this embodiment, a lens barrel of the third lens group can be omitted, thereby helping to reduce the size of the camera module. In addition, the third lens group can move with the photosensitive assembly during the active alignment process, so as to adjust its relative position with the first and second lens groups, thereby improving the imaging quality of the camera module. It should be noted that the structure of the photosensitive assembly of the present application is not limited to the above-mentioned embodiment.

Figure 3:
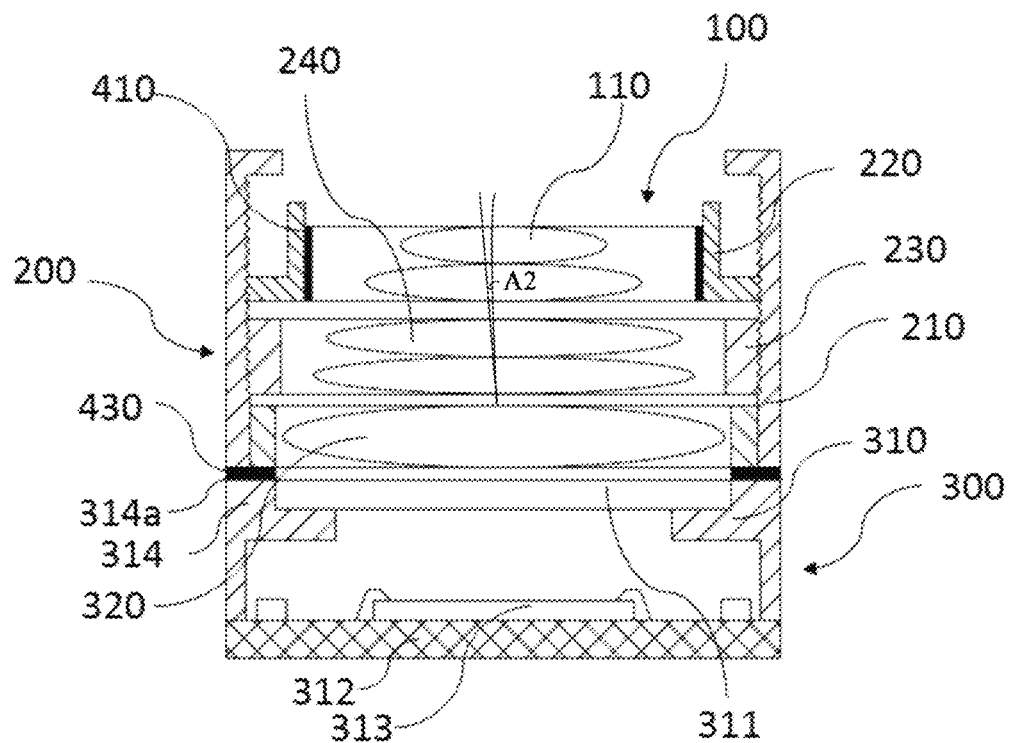
FIG. 3 shows a schematic cross-sectional view of an optical zoom camera module according to another embodiment of the present application.

Further, FIG. 3 shows a schematic cross-sectional view of an optical zoom camera module according to another embodiment of the present application. Referring to FIG. 3, in this embodiment, the optical zoom camera module includes two camera module components, a glue material that bonds the two camera modules together, and a photosensitive assembly. The difference between this embodiment and the embodiment in FIG. 1 is that the third lens group 320 is mounted in the motor housing 210, that is, as a part of the second camera module component 200. Specifically, in this embodiment, the optical zoom camera module includes a first camera module component 100 and a second camera module component 200. The first camera module component 100 includes a first lens group 110. The second camera module component 200 includes a motor housing 210, a first motor carrier 220, a second motor carrier 230, a second lens group 240 and a third lens group 320. The first motor carrier 220 and the second motor carrier 230 are respectively movably connected with the motor housing 210, and the second lens group 240 is mounted on the second motor carrier 230, and the third lens group 320 is fixed to the motor housing 210. The glue material includes a first glue material 410, the first glue material 410 is located between the first camera module component 100 and the first motor carrier 220, and the cured first glue material fixes and supports the first camera module component 100 and the first motor carrier 220, so that the relative positions of the two are maintained at the relative positions determined by the active alignment. In the actual production process, due to the manufacturing tolerances of the optical elements themselves and the assembly tolerances in the process of assembling the optical elements into lens groups, the position determined by the active alignment for the best imaging effect may be relatively inclined. In other words, an axis of the first camera module component and an axis of the first motor carrier may have an included angle A2 that is not zero. Further, the photosensitive assembly 310 can be bonded to the second camera module component 200 through a third glue material 430. The third glue material 430 may be provided between a top surface of the photosensitive assembly 310 and a bottom surface of the second camera module component 200. The bottom surface of the second camera module component 200 may be a bottom surface of the motor housing and/or a bottom surface of a structure area of the third lens group. The third lens group includes a structure area and an optical area, wherein the optical area is an area for optical imaging, and the structure area is a part surrounding the optical area (usually acting as a structural member).

Figure 4:
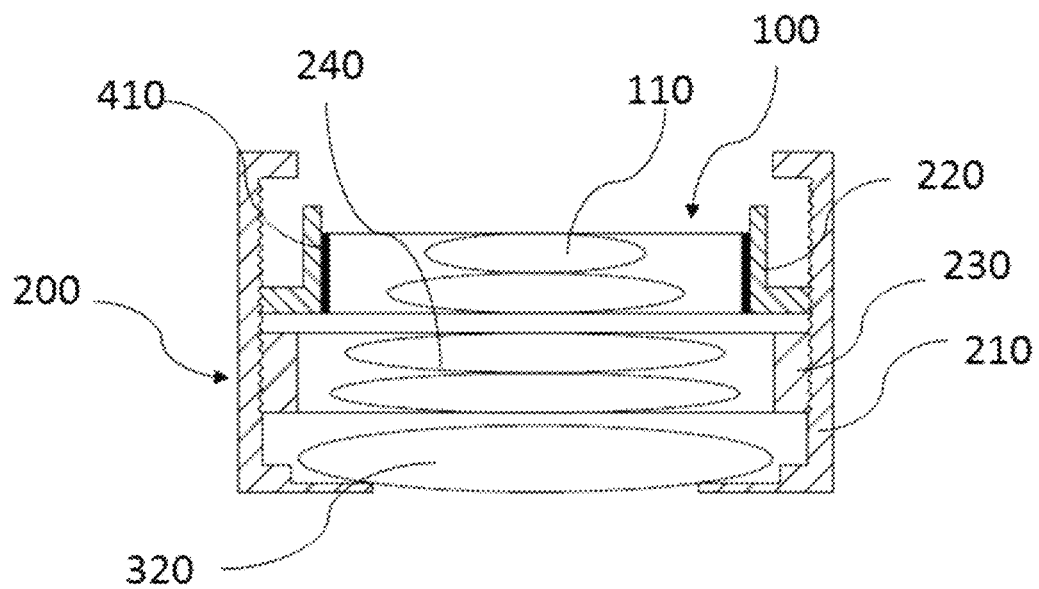
FIG. 4 shows a schematic diagram of an optical zoom optical lens according to another embodiment of the present application.

Further, FIG. 4 shows a schematic diagram of an optical zoom optical lens according to another embodiment of the present application. Compared with the embodiment in FIG. 3, the photosensitive assembly is not mounted in this embodiment, and the rest are the same as the embodiment in FIG. 3.

Further, in a modified embodiment, the third lens group in the camera module shown in FIG. 2 can also be fixed to the motor housing (that is, the third lens group is used as a part of the second lens component), for bonding based on the active alignment technology, and after bonding the upper subgroup of first lens group and the lower subgroup of first lens group, an optical zoom optical lens is obtained. Finally, the optical zoom optical lens is mounted on the photosensitive assembly to obtain an optical zoom camera module.

In the above-mentioned embodiments, the motors that can be used can be various forms of optical actuators such as piezoelectric motors (motors based on piezoelectric ceramics), voice coil motors (VCM motors, such motors are usually made of elastic sheet to realize the movable connection of the motor carrier), ball motors (the movable connection of the motor carrier are usually realized by a combination of a ball and a movement guide piece such as a guide rail). When a voice coil motor is used, the motor carrier (such as the first motor carrier and/or the second motor carrier) is driven by an electromagnetic drive module. Under the driving of the drive module, the motor carrier can move relative to the motor housing along the optical axis within a designed stroke range. In the above-mentioned embodiment, at least two motor carriers can be respectively moved under the driving of the drive module, so as to realize optical zoom. Moreover, in some embodiments of the present application, the movement of the motor carrier may also deviate from the direction of the optical axis, so as to achieve other optical functions such as optical anti-shake.

It should be noted that the above-mentioned embodiments are not exhaustive, and the optical zoom camera module of the present application can be implemented in many variants. For example, in a modified embodiment, the lens groups that constitute the optical system may be greater than three. For another example, in another modified embodiment, the third lens group can be separated from the photosensitive assembly, and two (or more) optical lens components (i.e., the aforementioned camera module components) are assembled into an optical zoom lens (the optical zoom lens is assembled based on active alignment technology, as shown in FIG. 4), and then the optical zoom lens and the photosensitive assembly are assembled together. For another example, in another modified embodiment, the third camera module component may further include a third motor carrier, and the third lens group may be mounted on the third motor carrier, and then three (or more) camera module components are assembled based on active alignment technology. In this way, the camera module can have three lens groups with zoom adjustment capabilities.

In summary, in this application, the optical zoom camera module includes at least two camera module components and a glue material located between the at least two camera module components; each of the at least two camera module components has a lens group, each of the lens groups includes at least one lens, all the lens groups of the at least two camera module components together constitute an imagable optical system, and at least two lens groups and a motor carrier is fixed together and can be moved under the driving of the motor; wherein the cured glue material fixes and supports the at least two camera module components, so that the relative positions of the at least two camera module components are maintained at the relative position determined by the active alignment, wherein the active alignment adjusts the relative position of the at least two camera module components based on the actual imaging result of the optical system.

In the above embodiment, the lens group may be a single lens, or may be assembled by a plurality of lenses. When the lens group is assembled by a plurality of lenses, the plurality of lenses can be assembled together by mutual fitting or bonding, or can be assembled together based on a lens barrel. For example, in one embodiment, the first lens group may be a single first lens, the second lens group may be a plurality of second lenses sequentially embedded in the lens barrel, and the third lens group may be a single third lens. In other words, the number of lenses in each lens group can be flexibly determined according to the optical design. The assembling method of the lens group can also be adjusted as needed. When the lens group is assembled by the lens barrel, the camera module component in the foregoing embodiment may include the lens barrel. For example, the outer side of the lens barrel and the inner side of the motor carrier may be screwed together.

Further, in an embodiment, the motor carrier (which may be the first motor carrier or the second motor carrier) and the motor housing can be screwed or connected by a guide rail, because the motor carrier and the motor housing are movably connected, so in the case of screw connection or rail connection, the screw or rail can be used as the movement guide piece of the motor carrier.

Further, FIG. 5 shows a periscope optical zoom camera module in an embodiment of the present application. Referring to FIG. 5, the periscope optical zoom camera module includes an light path turning device 2000 and an optical zoom camera module 1000. The light path turning device 2000 is used for turning the incident light by 90 degrees to enter a light incident surface of the optical system (referring to the optical system composed of multiple lens groups). The light path turning device 2000 may be a light reflecting prism. In this embodiment, the optical axis direction of the optical zoom camera module is perpendicular to the thickness direction of the terminal device (such as a smart phone), which avoids the increase in the thickness of the terminal device due to the increase in the number of groups and the number of lenses of the optical zoom camera module. It also avoids the increase in the thickness of the terminal device caused by the movement stroke of the lens group reserved for the optical zoom. Therefore, the periscope design of this embodiment contributes to the miniaturization of terminal equipment.

Further, in an embodiment of the present application, in the active alignment, the measured value of the optical performance of each movable lens group in its entire stroke is used as an evaluation index to determine whether the imaging quality meets the standard. Wherein, the movable lens group refers to the lens group that moves under the driving of the motor carrier after the assembly is completed (for example, the first lens group and/or the second lens group described above). In another embodiment, multiple positions within the stroke may be used to represent the entire stroke. For example, for each movable lens group, multiple positions within its stroke can be selected as representative positions. During the active alignment, the measured values of the optical performance of these representative positions are measured to determine whether the imaging quality is up to standard. It should be noted that the above measured values of optical performance refer to the measured values of optical performance of the entire optical system (for example, the optical system composed of the first, second, and third lens groups).

Further, according to an embodiment of the present application, a corresponding method for assembling the optical zoom camera module is also provided, which includes steps S100-S300.

Step S100, pre-positioning at least two camera module components separated from each other, wherein each of the at least two camera module components has at least one lens group, and at least two of the lens groups of the at least two camera module components are movable lens groups, and the at least two movable lens groups are respectively fixed with different motor carriers so as to move separately under the driving of the motor, and the pre-positioning makes all lens groups of the at least two camera module component together constitute an imagable optical system.

Step S200: performing active alignment on the at least two camera module components, wherein the relative positions of the at least three camera module components are adjusted based on the actual imaging result of the optical system.

In step S300, bonding the at least two camera module components by glue material, so that the relative positions of the at least two camera module components are maintained at the relative positions determined by the active alignment.

Further, in one embodiment, the at least two camera module components include a first camera module component, a second camera module component, and a third camera module component; wherein, the first camera module component includes a first lens group, the second camera module includes a second lens group, and the third camera module component includes a photosensitive assembly and a third lens group mounted on the photosensitive assembly.

Further, in one embodiment, the second camera module component further includes a motor housing, a first motor carrier, and a second motor carrier, wherein the first motor carrier and the second motor carrier are movably connected to the motor housing, respectively, and the second lens group is mounted on the second motor carrier.

Further, in one embodiment, in the bonding step (i.e., step S300), the glue material includes a first glue material, and the first glue material is provided between the first camera module component and the first motor carrier, and then the first glue material is cured, and the cured first glue material fixes and supports the first camera module component and the first motor carrier so that the relative positions of the two are maintained at the relative positions determined by the active alignment.

Further, in one embodiment, in the bonding step (ie step S300), the glue material further includes a second glue material, and the second glue material is provided between the photosensitive assembly and the motor housing, then the second glue material is cured, and the cured second glue material fixes and supports the photosensitive assembly and the motor housing, so that the relative positions of the two are maintained at the relative positions determined by the active alignment.

According to another embodiment of the present application, the at least two camera module components include a first camera module component and a second camera module component; the first camera module component includes an upper subgroup of first lens group, the second camera module component includes a lower subgroup of first lens group, a second lens group, a motor housing, a first motor carrier and a second motor carrier, wherein the first motor carrier and the second motor carrier movably connected with the motor housing, respectively, the first lens subgroup is mounted on the first motor carrier, and the second lens group is mounted on the second motor carrier. In the bonding step (i.e., step S300), the glue material includes a first glue material, and the first glue material is provided between the upper subgroup of first lens group and the lower subgroup of first lens group, and then the first glue material is cured, and the cured first glue material fixes and supports the upper subgroup of first lens group and the lower subgroup of first lens group so that the relative positions of the two are maintained at the relative positions determined by active alignment. Further, in an embodiment, the second camera module component further includes a third lens group fixed to the motor housing. In other words, in this embodiment, the third lens group is separated from the photosensitive assembly before the active alignment. In this embodiment, the optical zoom optical lens can be assembled through the active alignment, and then the optical zoom optical lens and the photosensitive assembly are bonded to obtain the optical zoom camera module.

Further, in one embodiment, the at least two camera module components further include a third camera module component, which includes a photosensitive assembly and a third lens group mounted on the photosensitive assembly. In other words, in this embodiment, the third lens group has been combined with the photosensitive assembly before the active alignment to constitute the third camera module component. The third camera module component can participate in active alignment as an integral component with adjustable position. After the first, second and third camera module components are assembled, the optical zoom camera module can be directly obtained.

Further, in one embodiment, in the pre-positioning step (i.e., step S100) and the active alignment step (i.e., step S200), the second camera module component is fixed, and the first camera module component and the third camera module component is clamped and moved with a fixture (or other capture device, such as an adsorption device) to perform pre-positioning and active alignment. Generally, the second camera module component is located in the middle, the middle camera module component is fixed, and the camera module components located above and below are moved, which facilitates the arrangement of the fixture and its driving mechanism and prevents interference between equipment, and help to improve the production yield of camera modules. It should be noted that the camera module assembly method of the present application is not limited to the above-mentioned embodiment. For example, in another embodiment, the second camera module component may be positionally adjustable (i.e., it can be moved in multiple degrees of freedom during pre-positioning and active alignment).

Further, in one embodiment, in the active alignment step (i.e., step S200), in case that the imaging quality of the optical system still fails to meet the standard after the active alignment is attempted, the first camera module component and the second camera module component or the third camera module component are replaced. After replacing the first camera module component, the second camera module component, or the third camera module component, the optical zoom camera module assembly method further includes: pairing the replaced first camera module component, the second camera module component, or the third camera module component with other camera module components to assemble an optical zoom camera module with imaging quality up to standard. In this embodiment, the relative position between the groups is adjusted and determined according to the actual measurement value of the optical performance (the real resolution of the image, such as sharpness, etc.) during assembly. For processing materials that cannot be adjusted to achieve performance standards, only a single group can be discarded, or the replaced group can be assembled with other groups (seeking to offset the deviation between groups), so production costs can be reduced.

Further, in one embodiment, the active alignment step (i.e., step S200) further includes: obtaining the actual measurement value of optical performance of the optical system based on actual imaging results within the entire stroke of each of the at least two movable lens groups; or, at a plurality of representative positions representing the entire stroke of each of the at least two movable lens groups, obtaining the actual measurement value of the optical performance of the optical system based on the actual imaging result.

The following will further introduce the active alignment process used in the assembly method for the optical lens or camera module. Since the camera module components described herein all have lens groups, the camera module components can also be referred to as lens components. In this application, during the assembly process of the optical zoom lens or the optical zoom camera module, the active alignment between the first lens component and the second lens component (or the first camera module and the second camera module), and the active alignment between the second lens component and the third lens component (or the second camera module and the third camera module) may be performed synchronously. To make the description concise, the following takes the active alignment between the first lens component and the second lens component as an example for description.

The active alignment described in this application can adjust the relative positions of the first lens component and the second lens component in multiple degrees of freedom. FIG. 6A shows a relative position adjustment manner in an active alignment in an embodiment of the present application. In this adjustment manner, the first lens component (or the first lens) can move along the x, y, and z directions relative to the second lens component (that is, the relative position adjustment in this embodiment has three degrees of freedom). The z direction is the direction along the optical axis, and the x and y directions are the directions perpendicular to the optical axis. The x and y directions are both in an adjustment plane P, and the translation in the adjustment plane P can be decomposed into two components in the x and y directions.

FIG. 6B shows a rotation adjustment in an active alignment of another embodiment of the present application. In this embodiment, in addition to the three degrees of freedom of FIG. 6A, the relative position adjustment also increases the degree of freedom of rotation, that is, the adjustment in the r direction. In this embodiment, the adjustment in the r direction is a rotation in the adjustment plane P, that is, a rotation around an axis perpendicular to the adjustment plane P.

Further, FIG. 6C shows a relative position adjustment manner added with adjustment in v and w directions in an active alignment according to another embodiment of the present application. Wherein, the v direction represents a rotation angle of the xoz plane, and the w direction represents a rotation angle of the yoz plane. The rotation angles of the v direction and the w direction can be combined into a vector angle, and this vector angle represents a total tilt state. In other words, by adjusting the v and w directions, the tilt attitude of the first lens component relative to the second lens component (That is, the tilt of an optical axis of the first lens component relative to an optical axis of the second lens component) can be adjusted.

The adjustment of the six degrees of freedom of x, y, z, r, v, and w may all affect the imaging quality of the optical system (for example, affect the size of the resolution). In other embodiments of the present application, the relative position adjustment manner may be to adjust only any one of the above six degrees of freedom, or a combination of any two or more of them.

Further, in one embodiment, during the active alignment, the adjustment of the relative position of the first lens component and the second lens component includes a translation on the adjustment plane, that is, a movement in the x and y directions.

Further, in one embodiment, during the active alignment, the adjustment of the relative position of the first lens component and the second lens component further includes: adjusting and determining an angle between the axis of the first lens component and the axis of the second lens component according to a measured resolution of the optical system, that is, the adjustment in the w and v directions. In the assembled optical lens or camera module, the axis of the first lens component and the axis of the second lens component have an included angle that is not zero.

Further, in one embodiment, during the active alignment, the adjustment of the relative position of the first lens component and the second lens component further includes: moving the first lens component in a direction perpendicular to the adjustment plane (i.e., adjustment in the z direction), and determining the relative position between the first lens component and the second lens component in a direction perpendicular to the adjustment plane according to the measured resolution of the optical system.

Further, in one embodiment, the first lens component may not have a first lens barrel. For example, the first lens component may be composed of a single first lens. Before the active alignment, the pre-positioning is performed firstly, so that there is a gap between the bottom surface of the first lens and the top surface of the second lens component; then the active alignment is performed, and then the glue material is provided in the gap and the glue material is cured. In this embodiment, the first lens may be formed by a plurality of sub-lenses that are fitted or adhered to each other to form a whole. In this embodiment, the side and top surface of the non-optical surface of the first lens that are not used for imaging may form a light shielding layer. The light shielding layer can be formed by screen printing a light-shielding material on the side and top surface of the first lens.

In one embodiment, during the active alignment, the second lens component can be fixed, the first lens component can be clamped by the fixture, and the first lens component can be moved under the driving of a six-axis motion mechanism connected with the fixture to realize the relative movement between the first lens component and the second lens component in the above six degrees of freedom. Wherein, the fixture can be leaned against or partially leaned against the side surface of the first lens component, thereby clamping the first lens component and performing position adjustment with multiple degrees of freedom.

It should be noted that, in one embodiment, in case that the first lens component includes the first motor housing, the fixture may be leaned against the outer side surface of the first motor housing.

In another embodiment, in case that the first lens part includes the first motor housing, the fixture for clamping the first lens component may include two sub-fixtures through which the first motor housing and the first lens group are respectively clamped, to keep the relative position of the first motor housing and the first lens group unchanged during the process of pre-positioning and active alignment. Here, the clamping of the first lens group can be directly clamping the first lens group, or by clamping the first motor carrier to clamp the first lens group, or by clamping the first lens barrel to clamp the first lens group. Further, when other lens components include a motor housing, the corresponding fixture (or a multi-degree-of-freedom stage with a suction device) may also include two sub-fixtures (or two other types of fixing devices, such as a suction device). to keep the relative position of the lens component and the motor housing unchanged during the process of pre-positioning and active alignment. It should be noted that in this embodiment, the lens component can also be regarded as a camera module component. The motor housings of different camera module components can be independent or shared.

In the above embodiment, the actual imaging result of the optical system composed of multiple lens groups can be obtained based on the image data output by the photosensitive chip. In the active alignment technology, a target board can be arranged on the object side, the photosensitive assembly of the third camera module component is energized, and the photosensitive assembly directly outputs the image data for imaging the target board, and the resolution data of the calibrated optical system can be obtained based on the image data to determine whether the image quality is up to standard The above description is only a preferred embodiment of the present application and an explanation of the applied technical principles. Those skilled in the art should understand that the scope of the invention involved in this application is not limited to the technical solution formed by the specific combination of the above technical features, and at the same time, it should also cover other technical solutions formed by any combination of the above technical features or their equivalent features without departing from the inventive concept. For example, the above-mentioned features and the technical features disclosed in this application (but not limited to) with similar functions are mutually replaced to form a technical solution.

The invention claimed is:

1. An optical zoom camera module, comprising: at least two camera module components and a glue material located between the at least two camera module components;
    wherein each of the at least two camera module components has at least one lens group, and each of the lens groups includes at least one lens, and all of the lens groups of the at least two camera module components together constitute an imageable optical system, and at least two of the lens groups are movable lens groups, and the at least two movable lens groups are respectively fixed with different motor carriers, and each of the different motor carriers is independently movably connected with a motor, so as to move separately under driving of the motor;
    wherein, the glue material in a cured state fixes and supports the at least two camera module components, so that relative positions of the at least two camera module components are maintained at relative positions determined by an active alignment, wherein the active alignment adjusts the relative positions of the at least two camera module components based on an actual imaging result of the optical system obtained by outputted image data of the optical zoom camera module; and
    wherein the at least two camera module components include a first camera module component and a second camera module component, and the different motor carriers include a first motor carrier and a second motor carrier, and the glue material includes a first glue material, and the first glue material is located between the first camera module component and the first motor carrier, and the first glue material in a cured state fixes and supports the first camera module component and the first motor carrier, so that relative positions of the two are maintained at the relative positions determined by the active alignment, wherein an axis of the first camera module component and an axis of the first motor carrier have an included angle that is not zero.

2. The optical zoom camera module according to claim 1, wherein the second camera module component includes a motor housing, the first motor carrier, the second motor carrier, and a second lens group, and the first motor carrier and the second motor carrier are respectively movably connected to the motor in the motor housing, and the second lens group is mounted on the second motor carrier.

3. The optical zoom camera module of claim 2, wherein the first camera module component includes a first lens group.

4. The optical zoom camera module of claim 2, wherein the second camera module component further includes a lower subgroup of first lens group, and the lower subgroup of first lens group is mounted on the first motor carrier; and the first camera module component includes a upper subgroup of first lens group.

5. The optical zoom camera module according to claim 4, wherein the first glue material is further located between the upper subgroup of first lens group and the lower subgroup of first lens group, and the first glue material in the cured state fixes and supports the upper subgroup of first lens group and the lower subgroup of first lens group, so that relative positions of the two are maintained at the relative positions determined by the active alignment, wherein an axis of the upper subgroup of first lens group and an axis of the lower subgroup of first lens group have an included angle that is not zero.

6. The optical zoom camera module according to claim 2, wherein the at least two camera module components further include a third camera module component, and the third camera module component includes a photosensitive assembly and a third lens group mounted on the photosensitive assembly.

7. The optical zoom camera module of claim 6, wherein the glue material further includes a second glue material, the second glue material is located between the photosensitive assembly and the motor housing, and the cured second glue material fixes and supports the photosensitive assembly and the motor housing, so that relative positions of the two are maintained at the relative positions determined by the active alignment, wherein an axis of the photosensitive assembly and an axis of the motor housing has an included angle that is not zero.

8. The optical zoom camera module according to claim 2, wherein the second camera module component further includes a third lens group, and the third lens group is fixed to the motor housing.

9. The optical zoom camera module according to claim 2, wherein the first motor carrier and/or the second motor carrier are movably connected to the motor housing through an elastic sheet; or the first motor carrier and/or the second motor carrier are movably connected to the motor housing through a combination of a ball and a movement guide piece.

10. The optical zoom camera module according to claim 1, wherein the actual imaging result of the optical system is an actual measurement value of optical performance of the optical system obtained based on the actual imaging result within an entire stroke of the at least two movable lens groups; or an actual measurement value of optical performance of the optical system obtained based on the actual imaging result at a plurality of representative positions representing the entire stroke of the at least two movable lens groups.

11. A method for assembling an optical zoom camera module, comprising:
pre-positioning at least two camera module components separated from each other, wherein each of the at least two camera module components has at least one lens group, and at least two lens groups of the at least two camera module components are movable lens groups, and the at least two movable lens groups are respectively fixed with different motor carriers, and the different motor carriers are independently movably connected with a motor, so as to move separately under driving of the motor, and the pre-positioning makes all of the lens groups of the at least two camera module components together constitute an imageable optical system;
actively aligning the at least two camera module components, wherein relative positions of the at least two camera module components are adjusted based on actual imaging results of the optical system; and
bonding the at least two camera module components by a glue material, so that the relative positions of the at least two camera module components are maintained at the relative positions determined by the active alignment;
wherein the at least two camera module components include a first camera module component and a second camera module component, and the different motor carriers include a first motor carrier and a second motor carrier, and the glue material includes a first glue material, and the first glue material is located between the first camera module component and the first motor carrier, and the first glue material in a cured state fixes and supports the first camera module component and the first motor carrier, so that relative positions of the two are maintained at the relative positions determined by the active alignment, wherein an axis of the first camera module component and an axis of the first motor carrier have an included angle that is not zero.

12. The method for assembling an optical zoom camera module according to claim 11, wherein the first camera module component includes a first lens group, and the second camera module includes a second lens group, a motor housing, the first motor carrier and the second motor carrier, and the first motor carrier and the second motor carriers are respectively movably connected with the motor in the motor housing, and the second lens group is mounted on the second motor carrier.

13. The method for assembling an optical zoom camera module according to claim 12, wherein the second camera module component further includes a third lens group fixed to the motor housing.

14. The method for assembling an optical zoom camera module according to claim 12, wherein the at least two camera module components further include a third camera module component, and the third camera module component includes a photosensitive assembly and a third lens group mounted on the photosensitive assembly.

15. The method for assembling an optical zoom camera module according to claim 14, wherein the glue material further includes a second glue material, and in the bonding step, the second glue material is provided between the photosensitive assembly and the motor housing, and the second glue material is then cured, and the cured second glue material fixes and supports the photosensitive assembly and the motor housing, so that relative positions of the two are maintained at the relative positions determined by the active alignment.

16. The method for assembling an optical zoom camera module according to claim 11, wherein the first camera module component includes an upper subgroup of first lens group, and the second camera module component includes a lower subgroup of first lens group, a second lens group, a motor housing, the first motor carrier, and the second motor carrier, and the first motor carrier and the second motor carrier are respectively movably connected with the motor in the motor housing, the lower subgroup of first lens group is mounted on the first motor carrier, and the second lens group is mounted on the second motor carrier.

17. The method for assembling an optical zoom camera module according to claim 16, wherein in the bonding step, the first glue material is further provided between the upper subgroup of first lens group and the lower subgroup of first lens group, and the first glue material is then cured, and the cured first glue material fixes and supports the upper subgroup of first lens group and the lower subgroup of first lens group, so that relative positions of the two are maintained at the relative positions determined by the active alignment.

\* \* \* \* \*